United States Patent [19]

Muccitelli

[11] Patent Number: 4,549,968
[45] Date of Patent: Oct. 29, 1985

[54] METHOD OF UTILIZING IMPROVED STABILITY OXYGEN SCAVENGER COMPOSITIONS

[75] Inventor: John A. Muccitelli, Elkins Park, Pa.

[73] Assignee: Betz Laboratories, Inc., Trevose, Pa.

[21] Appl. No.: 611,647

[22] Filed: May 18, 1984

[51] Int. Cl.[4] .................................................. C02F 1/20
[52] U.S. Cl. ..................................... 210/750; 252/178; 252/392; 252/393; 422/13; 422/16; 422/17
[58] Field of Search .................. 210/749, 750, 757; 252/178, 390, 392, 393, 401, 404; 422/13, 14, 16, 17

[56] References Cited

U.S. PATENT DOCUMENTS

| | | | |
|---|---|---|---|
| 4,278,635 | 7/1981 | Kerst | 422/14 |
| 4,279,767 | 7/1981 | Muccitelli | 252/178 |
| 4,282,111 | 8/1981 | Ciuba | 252/178 |
| 4,289,645 | 9/1981 | Muccitelli | 252/178 |
| 4,419,327 | 12/1983 | Kelly et al. | 422/17 |
| 4,487,708 | 12/1984 | Muccitelli | 422/13 |

FOREIGN PATENT DOCUMENTS

| | | | |
|---|---|---|---|
| 2113587 | 10/1971 | Fed. Rep. of Germany. | |
| 1324814 | 4/1963 | France. | |
| 45-14202 | 5/1970 | Japan | 422/17 |
| 45-13521 | 5/1970 | Japan | 422/17 |
| 51-93741 | 8/1976 | Japan. | |
| 57-204288 | 12/1982 | Japan | 210/757 |
| 875453 | 8/1961 | United Kingdom. | |

*Primary Examiner*—Peter Hruskoci
*Attorney, Agent, or Firm*—Alexander D. Ricci; Bruce E. Peacock

[57] ABSTRACT

Stable oxygen scavenger compositions adapted for storage without resulting in substantial sludge formation and oxygen scavenging methods of using the compositions are disclosed. The compositions comprise hydroquinone, a compatible amine termed a mu-amine, and a member selected from the group consisting of isoascorbic acid and ascorbic acid and water soluble salt forms thereof. Methods comprise adding from about 0.05–200 ppm hydroquinone, 0.001–400 ppm mu-amine, and about 0.00025–500 ppm of isoascorbic or ascorbic acid to the desired aqueous medium.

14 Claims, No Drawings

METHOD OF UTILIZING IMPROVED STABILITY OXYGEN SCAVENGER COMPOSITIONS

FIELD OF THE INVENTION

The present invention pertains to a method of utilizing improved stability oxygen scavenger compositions. The compositions are capable of being stored in inventory for lengthy periods without resulting in formation of substantial amounts of sludge therein. Typical methods of use for such compositions comprise use as oxygen scavengers in boiler feedwater and boiler condensate systems.

BACKGROUND

The presence of dissolved oxygen in industrial water systems is undesirable as it can create severe corrosion of associated metallurgical surfaces. In order to minimize oxygen based corrosion problems in boiler systems, mechanical deaeration is commonly used first and then followed by chemical scavenging.

PRIOR ART

Traditional chemical oxygen scavengers include sodium sulfite and hydrazine. However, sodium sulfite cannot be safely utilized in boiler systems operating at above about 1000–1500 psi as corrosive hydrogen sulfide and sulfur dioxide can be formed at pressures above this range. Also, at these pressures, dissolved solids from the sulfite-oxygen reaction product can become a significant problem.

Hydrazine is a toxic substance and is suspected to be carcinogenic. Hence, its use is undesirable.

U.S. Pat. Nos. 4,282,111 (Ciuba) and 4,278,635 (Kerst) both disclose the use of hydroquinone, per se, as an effective boiler water oxygen scavenger. Japanese Patent Publication No: SHO 45-14202 and U.S. Pat. No. 4,419,327 both disclose erythorbic acid (isoascorbic acid) boiler water oxygen scavenging. Ascorbic acid boiler water scavengers are disclosed in Japanese Patent Publication No: SHO 45-13521.

Commonly, boiler water oxygen scavengers are combined with neutralizing amines (which amines are adapted to treat the boiler steam condensate system) in order to provide a readily saleable one drum boiler treatment approach.

In conjunction with the use of a hydroquinone, hydrazine-free oxygen scavenger, it was surprisingly found that only certain amines were compatible with hydroquinone. These hydroquinone compatible amines are termed "mu-amines" and are disclosed in U.S. Pat. Nos. 4,289,645 and 4,279,767 (of common assignment herewith). However, in isolated instances, upon lengthy storage or inventory of the hydroquinone-mu-amine one drum treatment products, some sludging problems were encountered. Addition of a conventional sludge/dispersant to the hydroquinone-mu-amine products creates the potential for resulting in problems because of the possible incompatibility of the dispersant with other treatment chemicals in boiler feedwater. Moreover, addition of materials which function solely as sludge inhibitors results in a reduction in oxygen scavenging per weight of raw materials in the products.

Accordingly, there is a need in the art for an improved stability hydroquinone-mu-amine product that is capable of providing a very stable oxygen scavenging product that may be stored for lengthy periods of time. There is a further need for such a product which will not function to reduce the amount of oxygen scavenger per weight of raw material (actives) in the product.

DETAILED DESCRIPTION

These and other problems are overcome by use of the present invention. Specifically, the addition of isoascorbic acid or or water soluble salt forms thereof to the prior art compositions and methods disclosed in U.S. Pat. Nos. 4,279,767 and 4,289,645 will minimize product sludge formation. It is postulated that ascorbic acid will provide similar results. As ascorbic acid and isoascorbic acid are both well known boiler water oxygen scavengers, they can be utilized to replace some of the hydroquinone used in the scavenger compositions, thus maintaining a constant percentage of oxygen scavenging component in the formulation.

As to the mu-amines which are acceptable for use in the invention, these are detailed in the above-noted U.S. Pat. Nos. 4,279,767 and 4,289,645. The entire content of these patents is accordingly incorporated by reference herein. As is stated in these patents, a simple test sequence may be used to determine if any given amine is a mu-amine.

The steps of this test are as follows:

Step 1: To a 1 pint glass jar which can be equipped with a cover lid, add 80.0 grams of demineralized water and 10.0 grams of the amine to be tested.

Step 2: Stir the contents of the jar for one minute, preferably via a magnetic stirrer. If the amine is a solid, stir until complete dissolution into the water is attained.

Step 3: To the contents of the jar, after the amine has been thoroughly mixed with the water, add 10.0 grams of hydroquinone.

Step 4: Stir the contents of the jar for three minutes. If precipitation within the jar occurs, then the amine is not a mu-amine. If no precipitate formation within the jar is evident, the amine may possibly be a mu-amine, so proceed to Step 5.

Step 5: Seal the jar and stir vigorously for seven minutes.

Step 6: After stirring, filter the contents of the jar through a 5 micron filter paper via suction. If a non-filterable and/or insoluble mass remains on the filter paper (not merely discoloration of the paper) after filtration, of if an insoluble mass clings to the interior of the jar, then the amine is not a mu-amine. If the contents of the jar pass unhindered through the filter paper, the amine may possibly be a mu-amine and Steps 7 and 8 should be performed.

Step 7: Remove a 1.0 mL aliquot from the filtration flask or receiver (i.e., an aliquot of the former jar contents) with a syringe.

Step 8: Inject the contents of the syringe into the room temperature oxygen scavenger apparatus described in Example 4 above which contains air-saturated, demineralized water and sufficient sodium hydroxide to result in a pH 9–10 range in the reaction flask. If at least 70% of the dissolved oxygen initially present in the air-saturated water is removed within one minute after injection, the amine is definitely a mu-amine. If at least 70% of the dissolved oxygen is not removed within one minute, then the amine is not a mu-amine.

Known mu-amines include: aminomethylpropanol, triethylenetetramine, diisopropanolamine, sec-butylamine, monoisopropanolamine, ethylenediamine, dimethylaminopropylamine, monoethanolamine, dimethyl- (iso)propanolamine, methoxypropylamine and diethylaminoethanol.

The following compositional formulations and treatment levels are recommended:

| Composition Component | weight ratio of components (based upon weight of hydroquinone) | Recommended treatment level of component in aqueous system (based upon one million parts water) |
|---|---|---|
| (a) Hydroquinone | 1 | 0.05–200 ppm |
| (b) Mu-amine | 0.02–2.0 | .001–400 ppm |
| (c) Isoascorbic acid or ascorbic acid or water soluble salt form thereof | 0.05–2.5 | .00025–500 ppm |

At present, two compositions are preferred for use. The compositions are:

| Composition 1 | Composition 2 |
|---|---|
| Aqueous solution comprising hydroquinone, methoxypropylamine, isoascorbic acid in a weight ratio of 1:1.1:.11 | Aqueous solution comprising hydroquinone, methoxypropylamine, isoascorbic acid in a weight ratio of 1:.06:.11 |

The oxygen scavenger compositions may be added directly to the boiler feedwater or condensate system. It is preferred that the water be of alkaline pH. A pH of about 8.0 and greater is preferred.

EXAMPLES

The invention will now be further described with respect to the following examples of specific embodiments. These examples are illustrative only, and should not be construed as limiting the invention.

EXAMPLE 1

In order to assess the efficacy of the inventive compositions in inhibiting sludge formation, test compositions were prepared and allowed to age under the conditions noted hereinbelow for about five months. The procedure consisted of taking the stored samples and first vigorously shaking the sample bottles to ensure homogeneity and to loosen any residue which may have adhered to the sample bottle walls. A 20 mL aliquot of each sample was then drawn into a 30 mL syringe, which was subsequently fitted with a 25 mm membrane filter holder containing a 0.22 micron pore size membrane. The membranes were previously dried for about 2 hours at 100° C., cooled in a desiccator, and then weighed. The 20.0 mL aliquots were filtered through the membranes, yielding dark but clear filtrates. The clarity of the filtrates indicated that the 0.22 micron membranes were of sufficient pore size to quantitatively retain the sludge particles. The brown residues obtained on the membrane filters were dried overnight in a desiccator over prepared silica gel (the residues were not heated lest possibly losing the more volatile components of the residue) and weighed.

The percent residue reduction for each of the improved compositions of the invention was determined in accordance with the equation $$100 \times [(A-B)/A]$$

wherein:

A = weight of the residue filtered from a 20.0 mL aliquot of a control composition, and B = is the weight of residue filtered from a 20.0 mL aliquot of a composition in accordance with the invention. The percentage residue reduction for each of the tested samples is recorded in Table 1:

TABLE I

| Sample Identification | Storage Condition | Percent Residue Reduction (Relative to control Sample A) |
|---|---|---|
| I | W | 6 |
|   | X | 6 |
|   | Y | 30 |
|   | Z | 8 |
|   |   | Percent Residue Reduction (Relative to control Sample B) |
| II | W | 44 |
|    | X | 45 |
|    | Y | 5 |
|    | Z | 20 |

Storage Conditions:
W = sample sealed in glass and stored at ambient temperature
X = sample purged once per week with 100 mL of oxygen for 6 weeks then sealed and stored at ambient temperature
Y = sample sealed in glass and stored at 122° F.
Z = sample purged once per week as per storage condition x above and then stored at 122° F.

Samples (in accordance with the invention by weight) -
All percentages are:

| I = | Isoascorbic Acid (Erythorbic Acid) | 1% |
|---|---|---|
|   | Hydroquinone | 9% |
|   | Methoxypropylamine | 10% |
|   | Remainder water |   |
| II = | Isoascorbic Acid | .25% |
|   | Hydroquinone | 2.25% |
|   | Methoxypropylamine | .17% |
|   | Remainder water |   |

Control Samples

| A = | Hydroquinone | 10% |
|---|---|---|
|   | Methoxypropylamine | 10% |
|   | Remainder water |   |
| B = | Hydroquinone | 2.5% |
|   | Methoxypropylamine | .01% |
|   | Remainder water |   |

From the Table I, it can clearly be seen that inclusion of isoascorbic acid in the composition results in significant reduction in sludge formation when compared with the control oxygen scavenger samples of the types disclosed in the aforementioned U.S. Pat. Nos. 4,279,767 and 4,289,645 (both patents being of common assignment with the present invention). This sludge reduction is important as, in commercial use, steam generating plants commonly store such oxygen scavenger compositions prior to usage. Accordingly, by use of the improved compositions of the invention, the potential for problems relating to plugging of product handling equipment is minimized.

Other compositions which, it is thought, will provide comparable sludge reduction functions comprise:

EXAMPLE 2

| Hydroquinone | 9% |
|---|---|
| Methoxypropylamine | 10% |
| Ascorbic Acid | 1% |
| Remainder water |   |

EXAMPLE 3

| Hydroquinone | 9% |
| --- | --- |
| Any mu-amine selected from U.S. Pat. No. 4,289,645 or 4,279,767 | 10% |
| Ascorbic acid or isoascorbic acid | 1% |
| Remainder water | |

EXAMPLE 4

| Hydroquinone | 2.25% |
| --- | --- |
| Isoascorbic acid or ascorbic acid | .25% |
| Any mu-amine selected from U.S. Pat. No. 4,289,645 | .14% |

While the invention has been described hereinabove with respect to specific embodiments of same, such are not intended to limit the scope of the invention. The invention is intended to cover any equivalents, modifications, etc., and is to be limited solely by the scope of the appended claims.

I claim:

1. A method for reducing the amount of oxygen in an aqueous medium, comprising adding to said medium an effective amount for the purpose of a treatment comprising a stable solution of (a) hydroquinone, (b) mu-amine and (c) a member selected from the group consisting of isoascorbic acid, ascorbic acid and water soluble salt forms thereof, the weight ratio of (a):(b):(c) being within the range of 1:0.02–2.0:0.05–2.5, said stable solution being adapted for storage without resulting in substantial sludge formation therein.

2. A method as recited in claim 1 wherein said solution is an aqueous solution.

3. A method as recited in claim 2 wherein said treatment is added in an amount sufficient to provide from about 0.001–400 parts of said mu-amine (b) to one million parts of said aqueous medium.

4. A method as recited in claim 2 wherein said treatment is added in an amount sufficient to provide from about 0.00025–500 parts of said member (c) to one million parts of said aqueous medium.

5. A method as recited in claim 1 wherein said treatment is added in an amount sufficient to provide from abut 0.05–200 parts of hydroquinone (a) based upon one million parts of said aqueous medium.

6. A method as recited in claim 1 wherein said mu-amine (b) comprises a member selected from the group consisting of aminomethylpropanol, triethylenetetraamine, diisopropanolamine, sec-butylamine, monoisopropanolamine, ethylenediamine, dimethylaminopropylamine, monoethanolamine, dimethyl(iso)propanolamine, methoxypropylamine, and diethylaminoethanol.

7. A method as recited in claim 1 wherein said member (c) comprises isoascorbic acid or water soluble salt form thereof.

8. A method as recited in claim 7 wherein mu-amine comprises methoxypropylamine.

9. A method as recited in claim 1 wherein said aqueous medium comprises feedwater to a boiler.

10. A method as recited in claim 9 wherein said solution is an aqueous solution, said mu-amine (b) being methoxypropylamine and said member (c) being isoascorbic acid or water soluble salt form thereof.

11. A method as recited in claim 1 wherein said aqueous medium comprises condensed steam in a boiler condensate system.

12. A method as recited in claim 11 wherein said solution is an aqueous solution, said mu-amine (b) being methoxypropylamine and said member (c) being isoascorbic acid or water soluble salt form thereof.

13. A method as recited in claim 1 wherein said aqueous medium has an alkaline pH.

14. A method as recited in claim 13 wherein said pH is about 8 or greater.

* * * * *